(12) United States Patent
Guo et al.

(10) Patent No.: US 10,693,113 B2
(45) Date of Patent: Jun. 23, 2020

(54) BATTERY ELECTRODE AND SECONDARY BATTERY USING THE SAME

(71) Applicant: Ningde Amperex Technology Limited, Ningde (CN)

(72) Inventors: Peipei Guo, Ningde (CN); Yi Zhao, Ningde (CN); Ping He, Ningde (CN); Wenqiang Cheng, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 0 days.

(21) Appl. No.: 15/999,755

(22) Filed: Aug. 20, 2018

(65) Prior Publication Data

US 2019/0013505 A1    Jan. 10, 2019

Related U.S. Application Data

(63) Continuation of application No. 15/436,679, filed on Feb. 17, 2017.

(30) Foreign Application Priority Data

Feb. 26, 2016    (CN) .......................... 2016 1 0107413

(51) Int. Cl.
*H01M 2/14* (2006.01)
*H01M 4/04* (2006.01)
(Continued)

(52) U.S. Cl.
CPC ........... *H01M 2/14* (2013.01); *H01M 2/1673* (2013.01); *H01M 2/263* (2013.01);
(Continued)

(58) Field of Classification Search
CPC ...... H01M 2/26; H01M 10/0525; H01M 2/14; H01M 4/04; H01M 4/36; H01M 4/0404;
(Continued)

(56) References Cited

U.S. PATENT DOCUMENTS

2006/0147793 A1*  7/2006  Kim ..................... H01M 2/263
                                                             429/94
2015/0017523 A1*  1/2015  Hirai .................. H01M 4/0404
                                                             429/211
(Continued)

FOREIGN PATENT DOCUMENTS

CN    203367419 U    12/2013
CN    104078246      * 10/2014
(Continued)

OTHER PUBLICATIONS

CN105261727 MT (Year: 2016).*
(Continued)

*Primary Examiner* — Alexander Usyatinsky
(74) *Attorney, Agent, or Firm* — Morgan, Lewis & Bockius LLP

(57) ABSTRACT

The present application relates to the field of energy storage devices and, in particular, relates to a battery electrode, and a secondary battery using the battery electrode. The battery electrode comprises an electrode tab, a current collector, and a diaphragm attached onto at least one surface of the current collector, wherein the diaphragm is provided with a groove, the electrode tab is embedded into the groove and is electrically connected with the current collector, the electrode tab comprises an embedded portion embedded in the groove and an exposed portion protruded outside the groove; wherein an upper surface of the embedded portion is covered with an active material coating layer. According to the present application, an embedded electrode tab is adopted, and a diaphragm covers a surface of an embedded portion.

10 Claims, 5 Drawing Sheets

(51) Int. Cl.
*H01M 10/0525* (2010.01)
*H01M 4/13* (2010.01)
*H01M 2/26* (2006.01)
*H01M 4/139* (2010.01)
*H01M 2/16* (2006.01)

(52) U.S. Cl.
CPC ........... *H01M 4/0404* (2013.01); *H01M 4/13* (2013.01); *H01M 4/139* (2013.01); *H01M 10/0525* (2013.01)

(58) Field of Classification Search
CPC ........ H01M 4/139; H01M 2/263; H01M 4/13; H01M 2/1673
See application file for complete search history.

(56) References Cited

U.S. PATENT DOCUMENTS

| | | | |
|---|---|---|---|
| 2016/0126598 A1 | 5/2016 | Lee et al. | |
| 2017/0250446 A1* | 8/2017 | Kim | H01M 4/13 |

FOREIGN PATENT DOCUMENTS

| | | | |
|---|---|---|---|
| CN | 204792459 | * | 11/2015 |
| CN | 204792459 U | | 11/2015 |
| CN | 105261727 | * | 1/2016 |
| CN | 105261727 A | | 1/2016 |
| CN | 203733894 U | | 4/2016 |
| WO | WO2015072753 A1 | | 5/2015 |

OTHER PUBLICATIONS

CN204792459MT (Year: 2015).*
CN 104078246Mt (Year: 1014).*
Guo, Office Action, U.S. Appl. No. 15/436,679, dated May 14, 2019, 9 pgs.
Guo, Final Office Action, U.S. Appl. No. 15/436,679, dated Oct. 25, 2019, 12 pgs.
Guo, Advisory Action, U.S. Appl. No. 15/436,679, dated Jan. 24, 2020, 4 pgs.
Ningde Amperex Technology Ltd, CN201610107413, 3rd Office Action, (Translated), dated Jul. 20, 2018, (Year: 2018), 6 pgs.
First Office Action, CN 201610107413.9, dated Jul. 31, 2017, 14 pgs.

* cited by examiner

BATTERY ELECTRODE AND SECONDARY BATTERY USING THE SAME

CROSS-REFERENCE TO RELATED APPLICATIONS

The present application is a continuation of U.S. patent application Ser. No. 15/436,679, entitled "BATTERY ELECTRODE AND SECONDARY BATTERY USING THE SAME", filed Feb. 17, 2017, which claims priority to Chinese Patent Application No. 201610107413.9, entitled "BATTERY ELECTRODE AND SECONDARY BATTERY USING THE SAME", filed on Feb. 26, 2016, all of which are hereby incorporated by reference in their entirety.

TECHNICAL FIELD

The present application relates to the field of energy storage devices and, in particular, relates to a battery electrode and a secondary battery using the battery electrode.

BACKGROUND

Due to advantages such as high energy density, high average open circuit voltage and long cycle life and the like, Li-ion batteries have been widely applied in mobile and portable electrical appliances. The electrode of a commercialized Li-ion battery includes a current collector, an electrode tab and an active material layer, the active material layer is a continuous and uniform coating layer. A cathode electrode, an anode electrode and a separator together form a cell, and the thickness of the cell is the sum of the thickness of the cathode electrode, the thickness of the anode electrode, the thickness of the separator and the thickness of the electrode tab. Different portions of the cell have different thicknesses, and the portion where the electrode tab is welded has the maximum thickness. With respect to commercialized Li-ion batteries, the thickness of the model of batteries is generally defined according to the maximum thickness of the battery.

Since electronic products are developing to be smarter and multifunctional, requirements on the energy density of the Li-ion batteries are becoming higher and higher. Therefore, the battery needs to contribute a larger capacity within the same space. With respect to the traditional Li-ion battery, the thickness thereof is accumulated based on the thickness of the electrode tab, such that the thickness of the area where the electrode tab is welded is the maximum thickness of the battery, and the thickness of the area where no electrode tab is welded is relatively smaller. However, the space thereof cannot be fully utilized. As a result, within a specific range of models and sizes, it is hard to further improve the capacity of the battery. Accumulation of the thickness of the electrode tab to the thickness of the battery has become a bottleneck in further improvement of the energy density of the traditional Li-ion battery.

The cell of a conventional Li-ion battery is subjected to accumulation of thickness to the electrode cell by the electrode tab and the insulating adhesive, such that the electrode tab area is the area where the thickness of the battery is the maximum, and the space of the cell outside the electrode tab area is wasted, leading to a loss of energy density. Although the energy density loss may be improved by means of designing an electrode tab accommodating groove, the electrode tab accommodating groove contributes no energy, and the problem of accumulation of thickness caused by the insulating adhesive adhered on the electrode is not solved, thereby affecting sufficient improvement of the energy density.

In the related art, a groove is provided on the electrode, and the electrode tab is welded in the groove, so as to improve energy density. Chinese Patent Application CN 203733894 U has disclosed a Li-ion battery, in which a first groove is arranged on a cathode diaphragm, a second groove is arranged on an anode diaphragm, a cathode electrode tab is welded in the first groove, and an anode electrode tab is welded in the second groove; upper and lower surfaces of the cathode electrode tab are coated with a first insulating adhesive layer, and the surface of the cathode diaphragm corresponding to the second groove is coated with a second insulating adhesive layer. Since the active material layer is removed from the first groove and the second groove, thus no energy contribution is made in this region. In addition, the insulating adhesive layer also occupies a part of the space inside the battery, thereby affecting sufficient improvement of the energy density.

In view of the above defects in the related art, the present application is proposed.

SUMMARY

The present application provides a battery electrode, which is capable of improving capacity density of the battery.

The present application further provides a secondary battery prepared using the battery electrode according to the present application.

The present application further provides a method for preparing the battery electrode.

To achieve the above objectives of the present application, the following technical solution is adopted: a battery electrode, including an electrode tab, a current collector, and a diaphragm disposed on at least one surface of the current collector and comprising a groove configured to receive the electrode tab, in which the electrode tab is electrically connected with the current collector through the groove, the electrode tab includes an embedded portion embedded in the groove and an exposed portion protruded outside the groove, an active material coating layer is disposed on an upper surface of the embedded portion.

Preferably, a sum of a thickness of the embedded portion and a thickness of the active material coating layer is not greater than a thickness of the diaphragm.

Preferably, a sum of a thickness of the embedded portion and a thickness of the active material coating layer is equal to a thickness of the diaphragm.

Preferably, a depth of the groove is equal to a thickness of the diaphragm.

Preferably, the diaphragm and the active material coating layer are made of a same material or different materials.

Preferably, the battery electrode is a cathode electrode 3 including a cathode electrode tab 4, a cathode current collector 31 and a cathode diaphragm 32 attached onto at least one surface of cathode current collector, wherein the cathode diaphragm is provided with a first groove G31, the cathode electrode tab 4 is embedded into the first groove G31 and is electrically connected with the cathode current collector, and the cathode electrode tab 4 includes a first embedded portion embedded in the first groove G31 and a first exposed portion protruded outside the first groove, an upper surface of the first embedded portion is covered with a cathode active material coating layer 33.

Preferably, the battery electrode is an anode electrode 1 including an anode electrode tab 2, an anode current collector 11 and an anode diaphragm 12 attached onto at least one surface of anode current collector, wherein the anode diaphragm 12 is provided with a second groove G11, the anode electrode tab 2 is embedded into the second groove G11 and is electrically connected with the anode current collector 11, and the anode electrode tab 2 includes a second embedded portion embedded in the second groove G11 and a second exposed portion protruded outside the second groove G11, an upper surface of the second embedded portion is covered with an anode active material coating layer 13.

The present application further relates to a secondary battery, including the cathode electrode 3 and the anode electrode 1, wherein the cathode electrode 3 is the battery electrode according to the present application and/or the anode electrode 1 is the battery electrode according to the present application.

The present application further relates to a method for preparing the battery electrode, including following steps: welding the embedded portion onto the current collector, and coating an active material on a surface of the current collector, wherein the active material is attached onto upper surfaces of the current collector and the embedded portion, so as to respectively form the diaphragm and the active material coating layer.

The present application further relates to a method for preparing the battery electrode, including following steps: coating an active material on the current collector to form the diaphragm, providing a groove on the diaphragm, welding the embedded portion into the groove, and filling the active material into the groove and covering an upper surface of the embedded portion so as to form the active material coating layer.

The technical solutions provided in the present application may achieve the following beneficial effects:

Firstly, in the present application, an embedded electrode tab is adopted, and the surface of an embedded portion of the electrode tab is further covered with an active material coating layer, without the need of using an insulating adhesive tape. This not only reduces accumulation of thickness to the cell by the electrode tab, but also further reduces accumulation of thickness to the electrode tab by the insulating adhesive tape, thereby improving the capacity density of the battery.

Secondly, in the present application, the internal space of the battery is maximally utilized, thereby improving the coating amount of the active material and further improving the capacity density of the battery.

With respect to the cathode electrode, according to the related art, a groove is arranged on the cathode electrode, and this region exerts no energy, and the insulating adhesive layer further occupies a part of the space in the battery, thereby affecting the full improvement of the capacity density of the battery. In the present application, a cathode active material, for example, lithium cobaltate, is coated on the surface of the cathode electrode tab, so as to improve the energy density of the cathode electrode.

With respect to the anode electrode, according to the related art, a groove is arranged on the anode electrode and thus the anode active material is reduced, such that the groove on the anode electrode fails to receive Li-ions from the corresponding cathode. This not only affects the full improvement of the energy density, but also causes lithium precipitation of the battery, thereby causing safety risks to the battery. In the present application, an anode active material is coated on the surface of the anode electrode tab, and the anode active material may be graphite. This not only improves the energy density, but also solves the problem of lithium precipitation.

REFERENCE SIGNS

1—Anode electrode
11—Anode current collector
12—Anode diaphragm
13—Anode active material coating layer
G11—Second groove
R11—Recess matching with the second groove
2—Anode electrode tab
3—Cathode electrode
31—Cathode current collector
32—Cathode diaphragm
33—Cathode active material coating layer
G31—First groove
R31—Recess matching with the first groove
G32—Cathode electrode alignment groove
R32—Cathode electrode alignment recess
4—Cathode electrode tab
5—Separator
T0—Insulating adhesive tape of an anode electrode tab in Comparative Example 1
T1/T2—Insulating adhesive tape of a cathode electrode tab in Comparative Example 1
T2'/T3'—Insulating adhesive tapes of G31 and R31 in Comparative Example 2
T1'/T4'—Insulating adhesive tapes of G32 and R32 in Comparative Example 2

The accompanying drawings herein are incorporated into and constitute a part of the specification, which illustrate embodiments of the present application and, together with the specification, serve to explain the principles of the present application.

DESCRIPTION OF EMBODIMENTS

Hereinafter, the embodiments of the present application are further illustrated with reference to the accompanying drawings. It should be understood that these embodiments are merely for illustrating the present application, rather than limiting the scope of the present application.

The present application is further described with reference to specific embodiments and the accompanying drawings. The expressions "front", "rear", "left", "right", "top" and "bottom" described in the present application are given with reference to the state where a diaphragm is disposed in the accompanying drawings.

Figure 1:
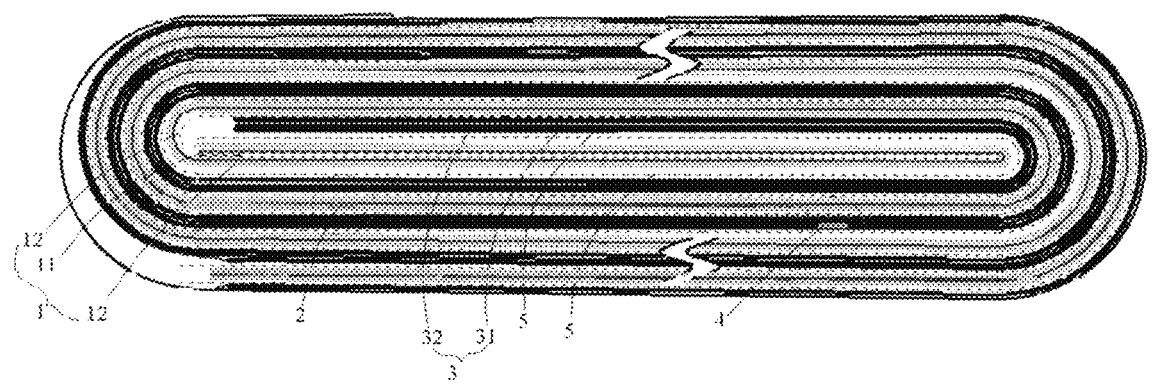
FIG. 1 is a schematic cross-sectional view of a battery cell according to an embodiment of the present application.

A battery electrode includes an electrode tab, a current collector, and a diaphragm attached onto at least one surface of the current collector, the diaphragm is preferably an active material layer and is provided with a groove, the electrode tab is embedded into the groove and is electrically connected with the current collector, the electrode tab includes an embedded portion embedded in the groove and an exposed portion protruded outside the groove; an upper surface of the embedded portion is covered with an active material coating layer. As illustrated in FIG. 1, the upper surface of the embedded portion is completely covered by an active material.

Preferably, the thickness of the embedded portion of the electrode tab is less than the thickness of the diaphragm; and the thickness of the embedded portion of the electrode tab may be the same as or different from the thickness of the exposed portion of the electrode tab. Herein, the present application only requires that the thickness of the embedded portion of the electrode tab is relatively small and less than the thickness of the diaphragm. As such, an active material coating layer may be arranged on the surface of the embedded portion, and the electrode tab is embedded into the active material coating layer.

Preferably, according to the present invention, the thickness of the exposed portion of the electrode tab is greater than the thickness of the embedded portion of the electrode tab.

Preferably, the sum of the thickness of the embedded portion and the thickness of the active material coating layer is not greater than the thickness of the diaphragm; and further preferably, the sum of the thickness of the embedded portion and the thickness of the active material coating layer is equal to the thickness of the diaphragm. In this way, an electrode of which the electrode tab is embedded into the diaphragm and having a diaphragm with a uniform thickness is prepared. The electrode may eliminate accumulation of thickness to the cell by the electrode tab, and maximally utilize the space in the cell, thereby improving coverage of the active material.

Preferably, the depth of the groove is equal to the thickness of the diaphragm, that is, the thickness of the embedded portion is less than the depth of the groove, such that a groove is still formed between the embedded portion and the diaphragm after the embedded portion of the electrode tab is welded to the groove, and the active material is filled into the groove to form the active material coating layer.

Preferably, the diaphragm and the active material coating layer are made from the same material or different materials.

Preferably, the groove fits the size of the embedded portion. In the present application, the groove which fits the size of the embedded portion refers to that the size of the groove is the same as that of the embedded portion, such that the embedded portion of the electrode tab is in close contact with the diaphragm seamlessly. The groove may be directly formed by a matching groove arranged in the embedded portion of the electrode tab; or the groove is merely intended to accommodate the embedded portion of the electrode tab and is not directly formed during the preparation process, for example, a reserved groove having a greater area may be arranged in advance, after the electrode tab is welded, an active material is filled into the gap to indirectly form the groove; or the electrode tab may be firstly welded, and then an active material is directly coated to form an active material coating layer on the surfaces of the diaphragm and the embedded portion of the electrode. In this way, the capacity that is brought by the space in the vicinity of the electrode will not be wasted, and an insulating adhesive is not needed, thereby preventing the insulating adhesive from accumulating thickness to the cell, and further improving the capacity density.

Preferably, the battery electrode is a cathode electrode 3, including a cathode electrode tab 4, a cathode current collector 31 and a cathode diaphragm 32 attached onto at least one surface of cathode current collector, the cathode diaphragm 32 is provided with a first groove G31, the cathode electrode tab 4 is embedded into the first groove G31 and is electrically connected with the cathode current collector 31, and the cathode electrode tab 4 includes a first embedded portion embedded in the first groove G31 and a first exposed portion protruded outside the first groove G31, an upper surface of the first embedded portion being covered with a cathode active material coating layer 33.

Preferably, the battery electrode is an anode electrode 1, including an anode electrode tab 2, an anode current collector 11 and an anode diaphragm 12 attached onto at least one surface of anode current collector, the anode diaphragm 12 is provided with a second groove G11, the anode electrode tab 2 is embedded into the second groove G11 and is electrically connected with the anode current collector 11, and the anode electrode tab 2 includes a second embedded portion embedded in the second groove G11 and a second exposed portion protruded outside the second groove G11, an upper surface of the second embedded portion being covered with an anode active material coating layer 13.

The present application further relates to a Li-ion battery, including a cathode electrode 3, an anode electrode 1, a separator 5 provided between the cathode electrode 3 and the anode electrode 1, and electrolyte. The cathode electrode 3 may be the cathode electrode according to the present application, or the anode electrode 1 may be the anode electrode according to the present application, or both the cathode electrode 3 and the anode electrode 1 are the electrodes according to the present application. A cross-sectional view of the cell thereof is schematically illustrated in FIG. 1.

According to the present application, the electrode may be obtained by firstly welding the electrode tab onto the current collector and then coating the active material, or by firstly coating the active material and arranging the groove, then welding the electrode tab into the groove, and finally filling the active material. One manner is: welding the embedded portion of the electrode tab onto the current collector, and then coating the active material on the current collector, the active material is attached on the surfaces of the current collector and the embedded portion of the electrode tab. Another manner is: coating the active material on the current collector to form a diaphragm, arranging the groove on the diaphragm for embedding the electrode tab therein, welding the embedded portion of the electrode tab into the groove, and then filling the active material into the groove to cover the upper surface of the embedded portion so as to form the active material coating layer. The active material may be specifically filled by means of extrusion, spraying or dipping, as long as the active material can be filled into the gap. With the above preparation method, the sum of the thickness of the embedded portion of the prepared electrode tab and the thickness of the active material coating layer coated on the upper surface thereof is not greater than the thickness of the diaphragm and, preferably, is equal to the thickness of the diaphragm.

Embodiment 1

Taking a 494090 model soft package Li-ion battery (a finished product of the battery has a thickness of 4.9 mm, a width of 40 mm and a length of 90 mm) as an example, the size of the anode electrode tab 2 is the same as that of the cathode electrode tab 4, the electrode tab has a welding length of 15 mm, and has a width of 6 mm and a thickness of 0.06 mm.

The cathode electrode 3 of the battery includes a cathode electrode tab 4, a cathode current collector 31 and a cathode diaphragm 32 attached on two surfaces of the cathode current collector, the cathode diaphragm 32 is provided with a first groove G31, the cathode electrode tab 4 is embedded into the first groove G31 and is electrically connected with the cathode current collector 31, and the cathode electrode tab 4 includes a first embedded portion embedded in the first groove G31 and a first exposed portion protruded outside the first groove G31, an upper surface of the first embedded portion being covered with a cathode active material coating layer 33. The cathode diaphragm 32 and the cathode active material coating layer 33 are made of the same material, i.e., $LiCoO_2$.

The anode electrode 1 of the battery is a conventional anode electrode, and includes an anode electrode tab 2, an anode current collector 11 and an anode diaphragm 12 attached on two surfaces of the anode current collector. The anode electrode 12 is provided with a second groove G11, and the anode electrode tab is embedded into the second groove G11 and is electrically connected with the anode current collector 11. The anode diaphragm 12 is made of graphite.

Figure 2:
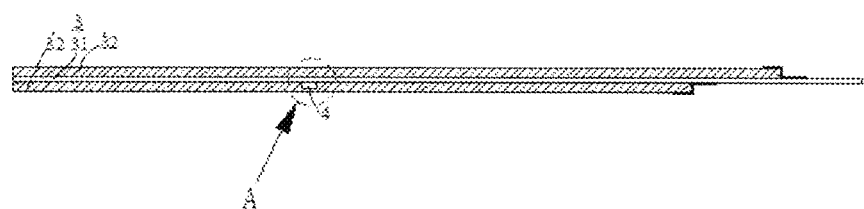
FIG. 2 is a schematic cross-sectional view of a cathode electrode according to an embodiment of the present application.
Figure 3:
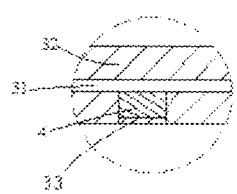
FIG. 3 is an enlarged view of part A of an electrode tab as illustrated in FIG. 2.

The preparation method includes: obtaining the first groove G31 for welding the cathode electrode tab 4 by means of laser cleaning on the cathode diaphragm 32, subsequently welding the embedded portion of the cathode electrode tab 4 into the first groove G31 by means of ultrasonic welding or braze welding or resistance welding or bonding, and then filling a cathode active material to cover the cathode electrode tab 4 by means of extrusion or spraying or dipping so as to form the cathode diaphragm 32 having two continuous and integrated surfaces. The cathode diaphragm 32 may also be prepared by firstly welding with the cathode electrode tab 4 and then coating the cathode active material;

FIG. 2 is a schematic cross-sectional view of the cathode electrode, and FIG. 3 is an enlarged view of part A of an electrode tab. Obtaining the second groove G11 for welding the anode electrode tab 2 by means of laser cleaning on the anode diaphragm 12, subsequently welding the embedded portion of the anode electrode tab 2 into the second groove G11 by means of ultrasonic welding or braze welding or resistance welding or bonding, not performing the step of filling the anode active material, and finally obtaining a conventional anode electrode 1.

Then forming a secondary battery cell by coiling the anode electrode 1, the cathode electrode 3 and the separator 5.

Embodiment 2

Taking a 494090 model soft package Li-ion battery (a finished product of the battery has a thickness of 4.9 mm, a width of 40 mm and a length of 90 mm) as an example, the size of the anode electrode tab 2 is the same as that of the cathode electrode tab 4, that is, the electrode tab has a welding length of 15 mm, and has a width of 6 mm and a thickness of 0.06 mm.

The anode electrode 1 of the battery includes an anode electrode tab 2, an anode current collector 11 and an anode diaphragm 12 attached on two surfaces of anode current collector, the anode diaphragm 12 is provided with a second groove G11, the anode electrode tab 2 is embedded into the second groove G11 and is electrically connected with the anode current collector 11, and the anode electrode tab 2 includes a second embedded portion embedded in the second groove G11 and a second exposed portion protruded outside the second groove G11, an upper surface of the second embedded portion being covered with an anode active material coating layer 13. The anode diaphragm 12 and the anode active material coating layer 13 are made of the same material, i.e., graphite.

The cathode electrode 3 of the battery is a conventional electrode, and includes a cathode electrode tab 4, a cathode current collector 31 and a cathode diaphragm 32 attached on two surfaces of the cathode current collector. The cathode electrode 32 is provided with a first groove G31, and the cathode electrode tab 4 is embedded into the first groove G31 and is electrically connected with the cathode current collector 31. The cathode diaphragm 32 is made of $LiCoO_2$.

Figure 4:
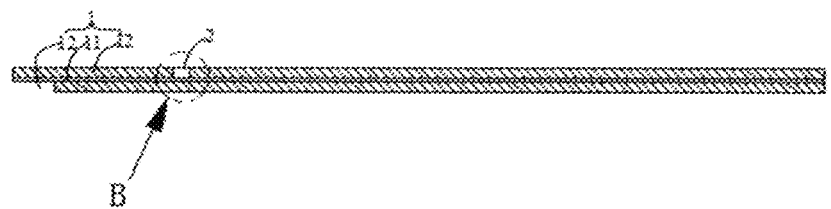
FIG. 4 is a schematic cross-sectional view of an anode electrode according to an embodiment of the present application.
Figure 5:
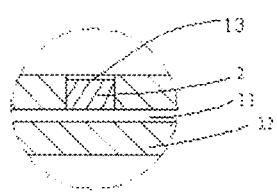
FIG. 5 is an enlarged view of part B of an electrode tab as illustrated in FIG. 4.

The preparation method includes:

obtaining the second groove G11 for welding the anode electrode tab 2 by means of laser cleaning on the anode diaphragm 12, subsequently welding the embedded portion of the anode electrode tab 2 into the second groove G11 by means of ultrasonic welding or braze welding or resistance welding or bonding, and then filling an anode active material to cover the embedded portion of the anode electrode tab 2 by means of extrusion or spraying or dipping so as to form the anode diaphragm 12 having two continuous and integrated surfaces; in the method, the anode electrode tab 2 may be firstly welded and then the anode active material is coated. FIG. 4 is a schematic cross-sectional view of the anode electrode. FIG. 5 is an enlarged view of part B of an electrode tab.

Obtaining the first groove G31 for welding the cathode electrode tab 4 by means of laser cleaning on the cathode electrode 3, subsequently welding the embedded portion of the cathode electrode tab 4 into the first groove G31 by means of ultrasonic welding or braze welding or resistance welding or bonding, not performing the step of filling the cathode active material, and finally obtaining a conventional cathode electrode 3.

Forming a secondary battery cell by coiling the anode electrode 1, the cathode electrode 3 and the separator 5.

Embodiment 3

Taking a 494090 model soft package Li-ion battery (a finished product of the battery has a thickness of 4.9 mm, a width of 40 mm and a length of 90 mm) as an example, the size of the anode electrode tab 2 is the same as the cathode electrode tab 4, the electrode tab has a welding length of 15 mm, and has a width of 6 mm and a thickness of 0.06 mm.

The cathode electrode 3 of the battery includes a cathode electrode tab 4, a cathode current collector 31 and a cathode diaphragm 32 attached on at least one surface of cathode current collector, the cathode diaphragm 32 is provided with a first groove G31, the cathode electrode tab 4 is embedded into the first groove G31 and is electrically connected with the cathode current collector 31, and the cathode electrode tab 4 includes a first embedded portion embedded in the first groove G31 and a first exposed portion protruded outside the first groove G31, an upper surface of the first embedded portion being covered with a cathode active material coating layer 33. The cathode diaphragm 32 and the cathode active material coating layer 33 are made of the same material, i.e., $LiCoO_2$.

The anode electrode 1 of the battery includes an anode electrode tab 2, an anode current collector 11 and an anode diaphragm 12 attached on at least one surface of anode current collector, the anode diaphragm 12 is provided with a second groove G11, the anode electrode tab 2 is embedded into the second groove G11 and is electrically connected with the anode current collector 11, and the anode electrode tab 2 includes a second embedded portion embedded in the second groove G11 and a second exposed portion protruded outside the second groove G11, an upper surface of the second embedded portion being covered with an anode active material coating layer 13. The anode diaphragm 12 and the anode active material coating layer 13 are made of the same material, i.e., graphite.

The preparation method includes:

obtaining the first groove G31 for welding the cathode electrode tab 4 by means of laser cleaning on the cathode diaphragm 32, subsequently welding the embedded portion of the cathode electrode tab 4 into the first groove G31 by means of ultrasonic welding or braze welding or resistance welding or bonding, and then filling a cathode active material to cover the cathode electrode tab 4 by means of extrusion or spraying or dipping so as to form the cathode diaphragm 32 having two continuous and integrated surfaces; in the method, the cathode electrode tab 4 may be firstly welded and then the cathode active material is coated. FIG. 2 is a schematic cross-sectional view of the cathode electrode; and FIG. 3 is an enlarged view of part A of an electrode tab.

Obtaining the second groove G11 for welding the anode electrode tab 2 by means of laser cleaning on the anode electrode 1, subsequently welding the embedded portion of the anode electrode tab 2 into the second groove G11 by means of ultrasonic welding or braze welding or resistance welding or bonding, and then filling an anode active material to cover the embedded portion of the anode electrode tab 2 by means of extrusion or spraying or dipping so as to form the anode diaphragm 12 having two continuous and integrated surfaces; in the method, the anode electrode tab 2 may be firstly welded and then the anode active material is coated. FIG. 4 is a schematic cross-sectional view of the anode electrode; and FIG. 5 is an enlarged view of part B of an electrode tab.

Forming a secondary battery cell by coiling the anode electrode 1, the cathode electrode 3 and the separator 5, FIG. 1 is a schematic cross-sectional view of the cell.

Comparative Example 1

Figure 6:
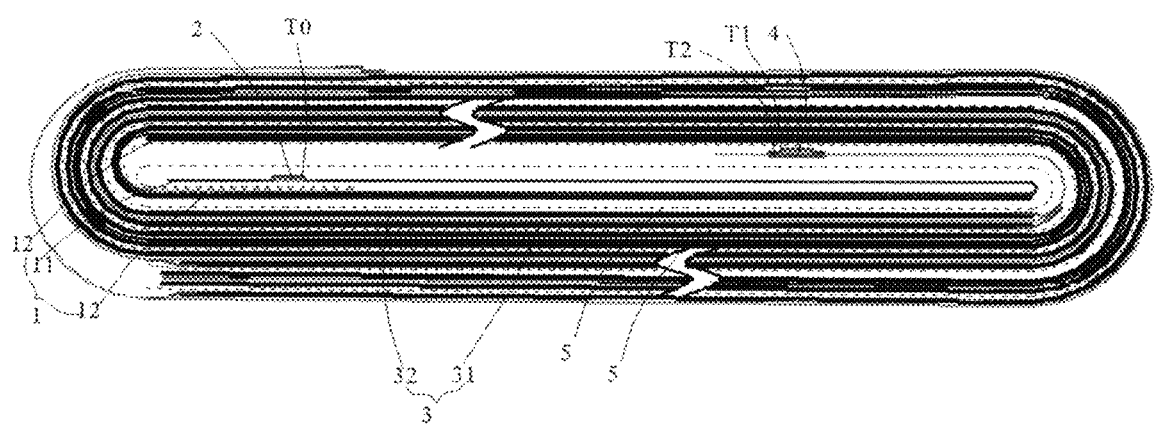
FIG. 6 is a schematic cross-sectional view of a battery cell in Comparative Example 1.
Figure 7:
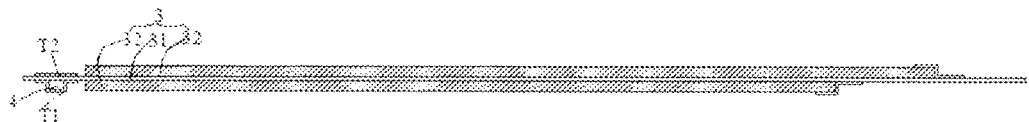
FIG. 7 is a schematic cross-sectional view of a cathode electrode in Comparative Example 1.
Figure 8:
FIG. 8 is a schematic cross-sectional view of an anode electrode in Comparative Example 1.

As illustrated in FIGS. 6-8, different from Embodiment 1, the cathode electrode 3 and the anode electrode 1 are not provided with any groove or insulating adhesive bonding and covering the groove, and the anode electrode tab 2 and the cathode electrode tab 4 are respectively welded onto the blank anode current collector 11 and cathode current collector 31 on the head portion of the electrode. The anode electrode tab 2 is bonded and coated by using the insulating adhesive T0, and the cathode electrode tab 4 and the current collector on the back of the cathode electrode tab 4 are respectively bonded and coated by using the insulating adhesives T1 and T2. The anode electrode 1, the cathode electrode 3 and the separator 5 are uni-directionally and coiled in parallel and the anode electrode 1 is disposed at an inner side, thereby forming a secondary battery cell.

FIG. 6 is a schematic cross-sectional view of a battery cell; FIG. 7 is a schematic cross-sectional view of a cathode electrode; and FIG. 8 is a schematic cross-sectional view of an anode electrode.

Comparative Example 2

As illustrated in FIGS. 9-13, different from Embodiment 1, the anode electrode 1 is provided with the second groove G11 and a recess R11 (a matching recess of G11) on the back of the anode electrode; the cathode electrode 3 is provided with G31 (the first groove), R31 (the recess matching with the first groove), G32 (the cathode electrode alignment groove) and R32 (the cathode electrode alignment recess).

Upon completion of welding of the electrode tab, no active material is filled, the G31 and R31 are respectively bonded and covered by using the insulating adhesive T2' (double-faced insulating adhesive tape for the recess matching with the second groove) and T3' (double-faced insulating adhesive tape for the recess matching with the second groove); and the G32 and R32 are respectively bonded and covered by using T1' (double-faced insulating adhesive tape for the cathode electrode alignment groove) and T4' (double-faced insulating adhesive tape for the cathode electrode alignment recess). A secondary battery cell is formed by coiling the anode electrode 1, the cathode electrode 3 and the separator 5.

Figure 9:
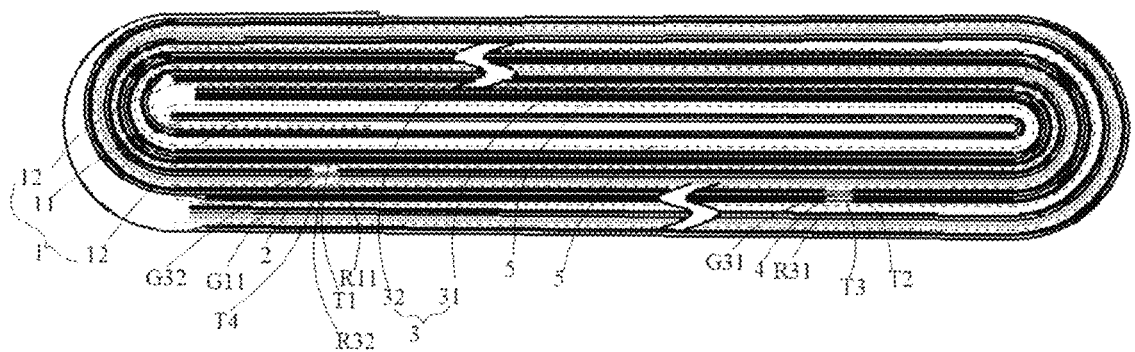
FIG. 9 is a schematic cross-sectional view of a battery cell in Comparative Example 2.
Figure 10:
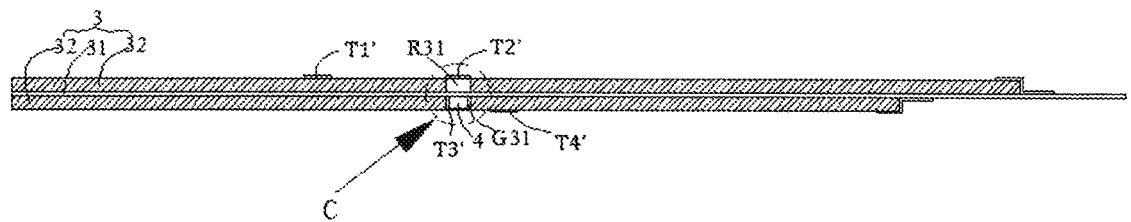
FIG. 10 is a schematic cross-sectional view of a cathode electrode in Comparative Example 2.
Figure 11:
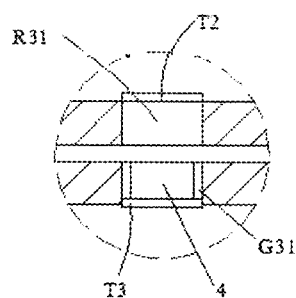
FIG. 11 is an enlarged view of an electrode tab in region C as illustrated in FIG. 10.
Figure 12:
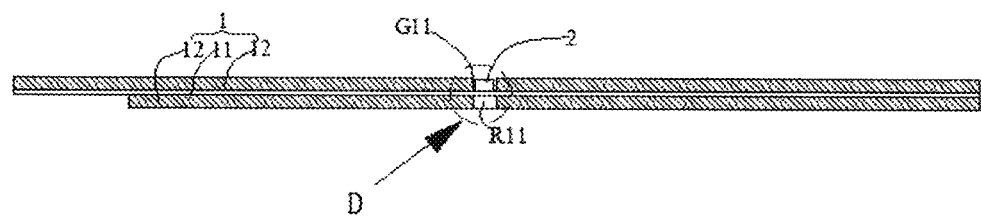
FIG. 12 is a schematic cross-sectional view of an anode electrode in Comparative Example 2.
Figure 13:
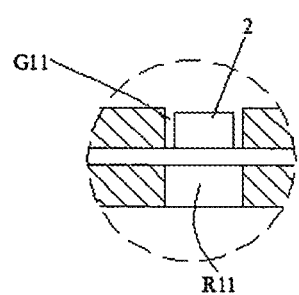
FIG. 13 is an enlarged view of an electrode tab in region D as illustrated in FIG. 12.

FIG. 9 is a schematic cross-sectional view of a battery cell in Comparative Example 2; FIG. 10 is a schematic cross-sectional view of a cathode electrode in Comparative Example 2; FIG. 11 is an enlarged view of an electrode tab in region C as illustrated in FIG. 10; FIG. 12 is a schematic cross-sectional view of an anode electrode in Comparative Example 2; FIG. 13 is an enlarged view of an electrode tab in region D as illustrated in FIG. 12.

Battery Performance Detection

A capacity test and a thickness DC measurement are carried out for the batteries obtained in Embodiments 1 to 3 and Comparative Examples 1 and 2.

Capacity test: charging the cell to an upper-limit voltage by using a nominal current, and then discharging the cell to the cut-off voltage by using the nominal current so as to acquire the capacity.

Volume energy density test:(capacity*nominal voltage)/volume.

Thickness test: Measurement is carried out by using a PPG thickness gauge.

The test results are listed in Table 1. As seen from the statistical data in Table 1, the average capacity and the average volume energy density are greatly improved relative to the comparative examples, and the DCR is relatively smaller.

TABLE 1

Capacity, volume energy density and battery thickness of batteries in Embodiments 1 to 3 and Comparative Examples 1 and 2

|  | Average capacity/ mAh | Average energy density per volume/Wh/L | Average thickness/ mm | Lithium precipitation |
|---|---|---|---|---|
| Embodiment 1 | 2865 | 721 | 4.797 | Yes |
| Embodiment 2 | 2870 | 723 | 4.797 | No |
| Embodiment 3 | 2890 | 729 | 4.787 | No |
| Comparative Example 1 | 2800 | 705 | 4.799 | No |
| Comparative Example 2 | 2845 | 717 | 4.796 | Yes |

Although the present application is disclosed above with reference to the preferred embodiments, the embodiments are not intended to limit the present application. Various variations and modifications may be made by those skilled in the art without departing from the spirit and scope of the present application. Therefore, the protection scope of the present application shall be subjected to the scope defined by the claims of the present application.

What is claimed is:

1. A battery electrode, comprising:
    an electrode tab;
    a current collector;
    a diaphragm, disposed on two sides of the current collector, the diaphragm comprising a groove on one of the two sides of the current collector configured to receive the electrode tab,
    wherein the electrode tab is electrically connected with the current collector through the groove, the electrode tab comprises an embedded portion embedded in the groove and an exposed portion protruded outside the groove;
    an active material coating layer is disposed directly on an upper surface of the embedded portion, wherein a sum of a thickness of the embedded portion and a thickness of the active material coating layer is less than or equal to a thickness of the diaphragm and there is no insulating adhesive tape on the active material coating layer.

2. The battery electrode according to claim 1, wherein a sum of a thickness of the embedded portion and a thickness of the active material coating layer is equal to a thickness of the diaphragm.

3. The battery electrode according to claim 1, wherein a depth of the groove is equal to a thickness of the diaphragm.

4. The battery electrode according to claim 1, wherein the diaphragm and the active material coating layer are made of a same material or different materials.

5. The battery electrode according to claim 1, wherein the battery electrode is a cathode electrode comprising a cathode electrode tab, a cathode current collector and a cathode diaphragm disposed on at least one surface of cathode current collector, the cathode diaphragm comprises a first groove configured to receive the cathode electrode tab, the cathode electrode tab is electrically connected with the cathode current collector through the first groove, the cathode electrode tab comprises a first embedded portion embedded in the first groove and a first exposed portion protruded outside the first groove, a cathode active material coating layer is disposed directly on an upper surface of the first embedded portion.

6. The battery electrode according to claim 1, wherein the battery electrode is an anode electrode comprising an anode electrode tab, an anode current collector and an anode diaphragm attached on at least one surface of anode current collector, the anode diaphragm comprises a second groove configured to receive the anode electrode tab, the anode electrode tab is electrically connected with the anode current collector through the second groove, the anode electrode tab comprises a second embedded portion embedded in the second groove and a second exposed portion protruded outside the second groove, an anode active material coating layer is disposed directly on an upper surface of the second embedded portion.

7. A secondary battery, comprising a cathode electrode and an anode electrode, wherein the cathode electrode is the battery electrode according to claim 5.

8. A secondary battery, comprising a cathode electrode and an anode electrode, wherein the anode electrode is the battery electrode according to claim 6.

9. A method for preparing the battery electrode according to claim 1, comprising following steps:
    welding the embedded portion onto the current collector; and
    coating an active material on a surface of the current collector.

10. A method for preparing the battery electrode according to claim 1, comprising following steps:
    coating an active material on the current collector to form the diaphragm;
    providing a groove on the diaphragm;
    welding the embedded portion into the groove; and
    filling the active material into the groove and covering an upper surface of the embedded portion.

* * * * *